INVENTORS
Hero Herbert Lanfers
Berend Riko ter Brugge
Hendrik Willem Sasse Mulder
BY Stevens, Davis, Miller & Mosher
their attorneys United States Patent Office 2,727,202
Patented Dec. 13, 1955

2,727,202

SYSTEM FOR PROTECTING AN ALTERNATING CURRENT MOTOR

Hero Harbert Lanfers, Berend Riko ter Brugge, and Hendrik Willem Sasse Mulder, Apeldoorn, Netherlands Application January 27, 1953, Serial No. 333,542

Claims priority, application Netherlands December 4, 1952

2 Claims. (Cl. 318—447)

The invention relates to a device for the protection of alternating-current motors.

In the usual devices for the protection of alternating current motors, an electromagnetic switch is used which, when the motor becomes overloaded, de-energizes said motor. However, in a system of this type there is the problem of de-energizing the protection system so that the motor can be started. If the protection system is not de-energized, then the starting current which is considerably in excess of the normal current would energize the protection device and prevent the motor from starting. In general, prior systems have solved this problem by the use of a number of relays, but by so doing they make the system very expensive and it requires a more regular supervision.

The invention aims at automatically making the protection device inactive during the starting period of the motor without using an additional relay so that an important simplification is obtained.

Figure 1:
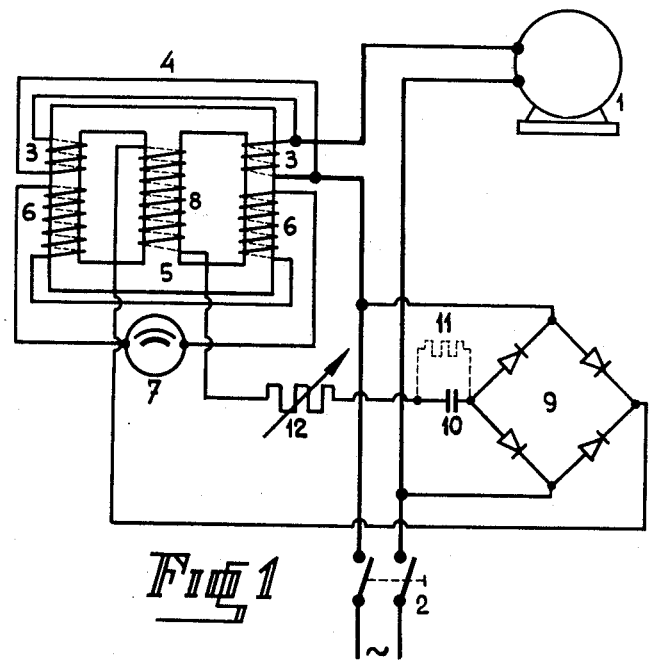

In the drawings Fig. 1 is schematic circuit diagram illustrating the general principle of the invention.

Figure 2:
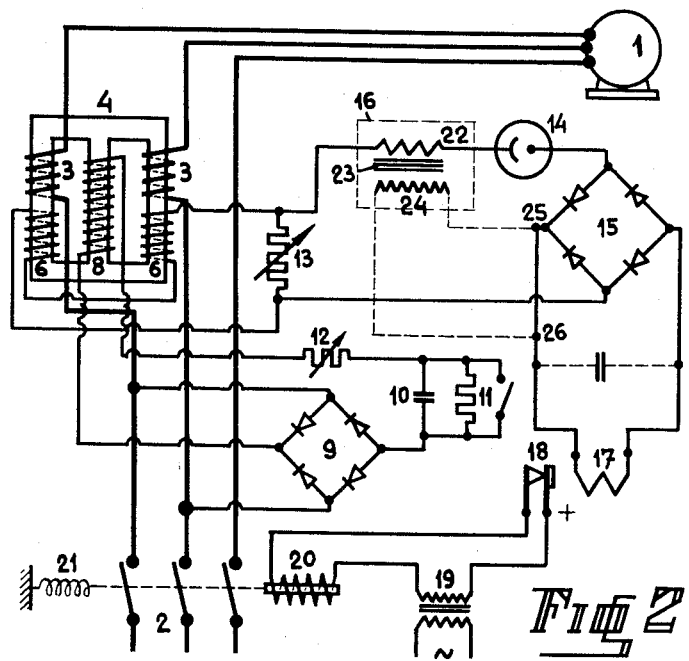

Fig. 2 is a circuit diagram of the invention as applied to the protection of a three phase motor.

According to Fig. 1, the primary coil 3 of a current-transformer 4 is provided between the alternating-current motor 1 and the main switch 2.

Preferably said transformer consists of a shell-type core in which two primary coils are provided e. g. in parallel. Around said primary windings secondary coils 6, 6 are provided, which can be arranged in series. The secondary transformer-terminals are connected to an ammeter 7.

Thus far the circuit corresponds to a normal circuit for an ammeter, in which a current transformer is connected in series with one of the current-conductors of a motor. A drawback is that with the large starting current it is necessary to use a meter with a much larger measuring range than necessary or to use a meter with a large alternation. Both methods represent complications which involve higher costs.

This invention modifies the conventional system as follows: around the middle leg of the current-transformer 4 a further coil 8 is arranged. This coil is connected in a circuit with a rectifier 9, preferably a Graetz rectifier. The input terminals of the rectifier are connected to the conductors feeding the motor 1 behind the motor switch 2. The output circuit of the rectifier includes a large condenser 10, incidentally bridged by a load resistance, and an adjustable series resistance 12 connected with the coil 8.

When switching-on the motor 1, under which condition the condenser 10 is not charged, the motor will start normally. The rectifier 9 receives a current and in the output circuit of said rectifier a direct current of large strength appears, said current charging the condenser 10. During said charging-period, which can be adjusted by means of the resistance 12 in such a way that said period substantially corresponds to the starting period of the motor 1, a strong direct current will occur in coil 8, said current being of such a value that the core will become substantially saturated. Consequently the transformer action proper will disappear temporarily and in the secondary windings substantially no voltage is induced so that the meter 7 will not show any deflection. However, as soon as the condenser 10 is charged, the current in the windings 8 disappears and the transformer 4 resumes its normal transformer action so that the meter 7 indicates the normal current. Therefore, if the charging period of the condenser corresponds to the starting period of the motor, the meter 7 during said period will not show any deflection and thereafter will indicate the normal current of the motor. Therefrom the meter may consist of a sensitive meter without attenuation.

As long as the motor is in operation the condenser 10 remains charged and the coil 8 remains currentless. After switching off the motor the condenser is discharged through the resistance 11 or by means of a further short circuiting contact of the switch 2.

In Fig. 2 an embodiment of the principle is shown, applied to a device for the protection of a machine-plant driven by a three-phase motor. The system operates so that as a consequence of an overload of the driven machine the current taken by the motor surpasses the maximally admissible value and the motor immediately is switched-off.

The construction of the current transformer 4 is substantially the same as shown in Fig. 1. The terminals of the secondary windings 6 are provided in the following circuit. In shunt with the windings an adjustable resistance 13 is provided, one of the terminals of which through a neon tube 14 is connected to one of the input-terminals of a rectifier in a circuit-arrangement according to Graetz, the other input terminal of which being connected to the other terminal of resistance 13.

The purpose of the device 16, which is not absolutely necessary will be discussed later. The direct-current output terminals of the rectifier 15 are connected to the windings 17 of a relay, the contact 18 of which is normally closed.

Said contact in a manner known per se, is provided in a circuit, fed by a small transformer 19, said circuit comprising the coil 20 of the switch 2, said coil keeping the switch 2 closed against the action of the spring 21.

The resistance 13 is adjusted in such a way, that during normal operation at the prevailing current and the secondary voltage of the current transformer occurring in that case, the neon tube 14 does not become conductive. When, however, an overload occurs, the neon tube 14 ignites and the direct current from the rectifier 15 energizes the relay windings 17. The contact switch 18 opens as a result of the energization of the relay winding 17 and coil 20 no longer carries any current. Because of this, spring 21 opens switch 2. As, however, the device is to remain inoperative during the starting-period of the motor, the arrangement described in Fig. 1 with relation to transformer 4 is used, so that a further discussion will not be necessary. Upon switching-on the motor 1, the coil 8 is passed by the charge-current of the condenser 10 and the transformer-operation of said current-transformer during said period is decreased in such a way, that the voltage in the neon tube 14 disappears almost entirely.

A further disadvantage of such circuit-arrangements is that with a small overload it may happen that the neon tube 14 will ignite only slowly and at an increasing rate, so that the motor will not be switched-off quick enough.

This invention effects an improvement of this case. To this end in the conductor leading to the neon tube 14, the device 16 is provided, consisting of a choke-coil 22 with a shell-type core 23, said core also comprising a direct current-coil 24, provided in one of the output-conductors of the rectifier 15, e. g. between the points 25 and 26, the direct connection between said points in this case being removed.

As soon as the neon tube 24 starts to ignite, the direct current from the rectifier 15 will pass the coil 24 and said coil is so dimensioned that the core 23 becomes strongly magnetised, and the impedance of the coil 22 decreases strongly. Consequently the voltage over the neon tube 14 increases strongly, so that said tube immediately ignites completely owing to which a much quicker operation is obtained at a small overload.

The core 23 is indicated only diagrammatically and in practice the choke 16 has a shell-type core as mentioned above.

For the protection of the rectifier 9 against destruction by alternating current in case one of the phases of the alternating current in the transformer 4 should fall out, it is preferred to provide a short circuited winding (not shown in the drawings) around the leg 5.

We claim:

1. A system for protecting an alternating current motor comprising a current transformer having two primary windings respectively connected in each of two leads to said motor, a core for said transformer comprising three longitudinal legs, one of said primary windings being arranged on each of two of said legs and a D. C. winding being arranged on said third leg, a bridge rectifier, means for connecting a condenser and said D. C. winding in series across the output terminal of said rectifier, two secondary windings for said transformer, one of said secondary windings being arranged on each of said two legs of said core carrying said primary windings, a magnetically operated switch having contacts in said motor leads, means to connect the input terminals of said rectifier across the motor leads on the motor side of said contacts, a second bridge rectifier, means for connecting a gaseous discharge device and said secondary windings across the input terminals of said rectifier, and a relay means responsive to the output of said second bridge rectifier for controlling said magnetically operated switch.

2. A device as claimed in claim 1 further including a choke coil in series with said discharge device and said secondary windings, a core for said choke coil, a D. C. winding on said choke coil, means to connect said D. C. winding in series with said relay coil.

No references cited.